US009380154B2

(12) United States Patent
Montpetit et al.

(10) Patent No.: US 9,380,154 B2
(45) Date of Patent: *Jun. 28, 2016

(54) SYSTEMS AND METHODS FOR SCORING PHONE NUMBERS

(71) Applicant: LexisNexis Risk Solutions Inc., Alpharetta, GA (US)

(72) Inventors: Nicholas Montpetit, Woodbury, MN (US); Pete Koets, Minneapolis, MN (US)

(73) Assignee: LEXISNEXIS RISK SOLUTIONS INC., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/841,036

(22) Filed: Aug. 31, 2015

(65) Prior Publication Data

US 2015/0373188 A1      Dec. 24, 2015

Related U.S. Application Data

(63) Continuation of application No. 14/274,222, filed on May 9, 2014, now Pat. No. 9,167,081.

(51) Int. Cl.
*H04M 1/56* (2006.01)
*H04M 15/06* (2006.01)
(Continued)

(52) U.S. Cl.
CPC ...... *H04M 3/42042* (2013.01); *H04M 3/42102* (2013.01); *H04M 3/42365* (2013.01); *H04W 8/18* (2013.01); *H04M 3/42246* (2013.01)

(58) Field of Classification Search
CPC .................... H04M 3/42042; H04M 3/42365; H04M 3/42059; H04M 3/436; H04M 3/30; H04M 7/006; H04M 1/663; G06F 17/30861; H04Q 3/0062; H04Q 10/107; H04Q 20/00; H04Q 20/341; H04Q 20/1014; H04Q 20/40145; H04Q 20/4016

USPC ........ 379/93.09, 93.11, 93.17, 93.23, 142.01, 379/142.04, 142.06, 142.17, 201.01, 379/201.02, 207.13, 207.14, 245, 246, 257

See application file for complete search history.

(56) References Cited

U.S. PATENT DOCUMENTS

| 6,751,459 | B1 * | 6/2004 | Lee | H04W 8/18 455/432.1 |
|---|---|---|---|---|
| 7,895,154 | B2 | 2/2011 | Newman | |

(Continued)

OTHER PUBLICATIONS

International Search Report and Written Opinion in related International Patent Application No. PCT/US15/21150, mailed Jul. 1, 2015.

*Primary Examiner* — Binh Tieu
(74) *Attorney, Agent, or Firm* — Troutman Sanders LLP; Ryan A. Schneider; Mark Lehi Jones (57) ABSTRACT

Certain implementations of the disclosed technology include systems and methods for determining a reachability score of a phone number. A method includes receiving personally identifiable information associated with the subject; querying one or more public or private databases with the personally identifiable information; receiving, in response to the querying, phone number information related to the personally identifiable information; extracting, from the phone number information, one or more phone numbers associated with the subject; determining, with one or more computer processors, based at least in part on the one or more phone numbers, a phone type corresponding to the respective one or more phone numbers; determining, with the one or more computer processors, a reachability score for at least one of the one or more phone numbers, wherein the reachability score is based, at least in part, on the phone type; and outputting an indication of the reachability score.

20 Claims, 5 Drawing Sheets

(51) Int. Cl.
*H04M 3/42* (2006.01)
*H04W 8/18* (2009.01)

(56) References Cited

U.S. PATENT DOCUMENTS

| | | | |
|---|---|---|---|
| 8,135,607 B2 * | 3/2012 | Williams | G06Q 30/02 |
| | | | 705/7.29 |
| 9,049,287 B2 * | 6/2015 | Masters | H04M 3/42059 |
| 2003/0216987 A1 | 11/2003 | Mollett et al. | |
| 2003/0216988 A1 | 11/2003 | Mollett et al. | |
| 2003/0217014 A1 | 11/2003 | Mollett et al. | |
| 2008/0109445 A1 * | 5/2008 | Williams | G06Q 30/00 |
| 2008/0243920 A1 | 10/2008 | Newman et al. | |
| 2010/0070405 A1 | 3/2010 | Joa et al. | |
| 2010/0114744 A1 | 5/2010 | Gonen | |
| 2010/0161603 A1 * | 6/2010 | Caceres | G06F 17/30539 |
| | | | 707/736 |
| 2010/0239084 A1 | 9/2010 | Brown et al. | |
| 2012/0063574 A1 * | 3/2012 | Or-Bach | G06Q 20/10 |
| | | | 379/88.23 |
| 2012/0207285 A1 | 8/2012 | Lawson et al. | |
| 2012/0307993 A1 | 12/2012 | Masters | |
| 2013/0060587 A1 * | 3/2013 | Bayrak | G06Q 10/10 |
| | | | 705/7.11 |
| 2014/0214482 A1 * | 7/2014 | Williams | G06Q 30/00 |
| | | | 705/7.29 |
| 2014/0344259 A1 * | 11/2014 | Horling | G06F 17/3053 |
| | | | 707/723 |

* cited by examiner

SYSTEMS AND METHODS FOR SCORING PHONE NUMBERS

CROSS REFERENCE TO RELATED APPLICATIONS

This application is a continuation of U.S. patent application Ser. No. 14/274,222, filed on 9 May 2014, and entitled "Systems and Methods for Scoring Phone Numbers," the contents of which is hereby incorporated by reference in its entirety. This application is also related to PCT application PCT/US2015/021150, filed on 18 Mar. 2015, entitled "Systems and Methods for Scoring Phone Numbers," the contents of which are hereby incorporated by reference in its entirety.

BACKGROUND

In today's society, most people can generally be reached by phone if the caller has a correct and updated phone number. A person may accumulate several phone numbers over their lifetime, and it is common for multiple different phone numbers to be associated with the person. For example, a person may have one phone number associated with a landline, another number associated with a cellular phone, another number associated with a work phone, and multiple other numbers associated with previous residences and/or previous cell phone numbers. In some cases, certain phone numbers may be a part of a publicly available record, for example, via phone books that list residential landline numbers. In other cases, private or semi-private records may be utilized to associate a particular person with a particular phone number. It is often difficult to determine which of the multiple phone numbers are accurate and up-to-date. A need exists to identify a phone number such that, when called, is likely to result in reaching a given subject.

SUMMARY

Some or all of the above needs may be addressed by certain implementations of the disclosed technology. Certain implementations may include systems and methods for scoring phone numbers. In particular, the scoring may provide an indication of the likelihood of reaching a particular subject by calling a particular phone number.

According to an example implementation, a computer-implemented method is provided. The method includes receiving personally identifiable information (PII) comprising at least a name of a subject and an address associated with the subject. The method includes querying one or more public or private databases with the personally identifiable information; receiving, in response to the querying, phone number information related to the personally identifiable information; extracting, from the phone number information, one or more phone numbers associated with the subject; determining, with one or more computer processors, based at least in part on the one or more phone numbers, a phone type corresponding to the respective one or more phone numbers; determining, with the one or more computer processors, a reachability score for at least one of the one or more phone numbers, wherein the reachability score is based, at least in part, on the phone type; and outputting an indication of the reachability score.

According to another example implementation, a system is provided. The system includes at least one memory for storing data and computer-executable instructions; and at least one processor configured to access the at least one memory. The at least one processor is further configured to execute the computer-executable instructions to receive personally identifiable information comprising at least a name of a subject and an address associated with the subject; query one or more public or private databases with the personally identifiable information; receive, in response to the querying, phone number information related to the personally identifiable information; extract, from the phone number information, one or more phone numbers associated with the subject; determine, with the at least one processor, based at least in part on the one or more phone numbers, a phone type corresponding to the respective one or more phone numbers; determine, with the at least one processor, a reachability score for at least one of the one or more phone numbers, wherein the reachability score is based, at least in part, on the phone type; and output an indication of the reachability score.

According to an example implementation of the disclosed technology, one or more non-transitory computer readable media are provided that include computer-executable instructions that, when executed by one or more processors, cause the one or more processors to perform a method comprising receiving personally identifiable information comprising at least a name of a subject and an address associated with the subject; querying one or more public or private databases with the personally identifiable information; receiving, in response to the querying, phone number information related to the personally identifiable information; extracting, from the phone number information, one or more phone numbers associated with the subject; determining, with one or more computer processors, based at least in part on the one or more phone numbers, a phone type corresponding to the respective one or more phone numbers; determining, with the one or more computer processors, a reachability score for at least one of the one or more phone numbers, wherein the reachability score is based, at least in part, on the phone type; and outputting an indication of the reachability score.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Some implementations of the disclosed technology will be described more fully hereinafter with reference to the accompanying drawings. This disclosed technology might, however, be embodied in many different forms and should not be construed as limited to the implementations set forth herein.

Certain example embodiments of the disclosed technology enable identifying a phone number such that, when called, is likely to result in reaching a given party, entity, person, etc., (herein collectively or individually referred to as a "subject"). Multiple phone numbers, for example, landline numbers, cellular phone numbers, work phone numbers, previous phone numbers, etc., can be associated with a given subject, and embodiments disclosed herein provide for weighting, scoring, and/or ranking the multiple phone numbers according to the likelihood that placing a call to a particular number will result in reaching a particular subject. In some cases, embodiments of the disclosed technology may be utilized, for example, to determine which of the multiple phone numbers associated with the subject are accurate and up-to-date.

Certain example embodiments of the disclosed technology may utilize one or more sources of information, if available, to determine phone numbers associated with a subject. Some implementations may score the phone numbers based on various classes of information, and/or combinations of available information. In accordance with various example implementations of the disclosed technology, weighting and/or scoring may utilize empirical information. For example, a phone number may be associated with a particular phone type, such as a cellular phone, a business phone, a residential phone, an Internet-based phone, a landline based phone, a spoofed phone number, a facsimile machine, etc. In certain example implementations, the phone type may correlate with an ability to reach the subject. For example, a number associated with a cellular-type of phone may have a higher "reachability" score than a number associated with a FAX machine. The term reachability is defined herein to mean "able to reach a particular subject by calling a particular phone number." Certain example implementations of the disclosed technology may use a different model to score reachability depending on the phone type. For example, cellular phones and landline phones may be scored using different models to account for differences, not only between such phones, but also in how or where associated information is stored. As an example, certain databases may be populated only by data associated with cellular phones.

According to an example implementation of the disclosed technology, a phone number may be scored based on an amount of time that has elapsed since a last known use or activity associated with the phone number. For example, a phone number that was used in the past week may have a higher reachability score than a phone number that was last used a year ago. In certain embodiments, the use, activity, or record associated with the phone number can include one or more of: actual use of the phone (for example, placing a call); the presence of the phone number on an application; the presence of the phone number in a public record; the use of the phone number in a private record; an indication of the phone number in a credit application; the use of the phone number in a purchase record; a phone bill; etc. Thus, according to certain embodiments, any number of data sources that indicate usage, activity, or records associated with a phone number can be utilized for scoring the phone number.

In accordance with an example implementation of the disclosed technology, information may be combined to produce an overall reachability score. For example, if independent information is available indicating a match between a person's name and a particular phone number, this combined information may increase the score. Likewise, if independent information is able to corroborate or verify a match between a person's address and a particular phone number, such combined information may increase the score.

According to an example implementation of the disclosed technology, a certain amount of information may be required as input in order to uniquely identifying a subject. In certain example embodiments, at least a name of the subject may be needed. In certain example embodiments, an address associated with the subject may be utilized, in addition to the name of the subject, for further narrowing the search for a particular subject and/or phone number. In certain example implementations, the input information, such as name, street address, city, state, zip code, phone number, etc., may be corroborated with independent information to affect the reachability score. For example, combinations of available data may be utilized in the weighting and scoring process. In certain embodiments, one or more of following data and/or associations/corroborations may be used in the reachability scoring of a particular phone number:

phone type (as discussed above);
 time since last known use (as discussed above);
 city match;
 state match;
 name match;
 zip code match;
 number of phones associated with the address;
 length of time the phone number has been in service;
 vendor;
 service provider;
 number of owners associated with the phone number;
 dwelling type associated with the address;
 disconnects;
 etc.

In various embodiments, one or more of following consumer level variables may be used in the reachability scoring of a particular phone number:

age of subject;
 property owner status;
 presence of derogatory public records;
 etc.

Figure 1:
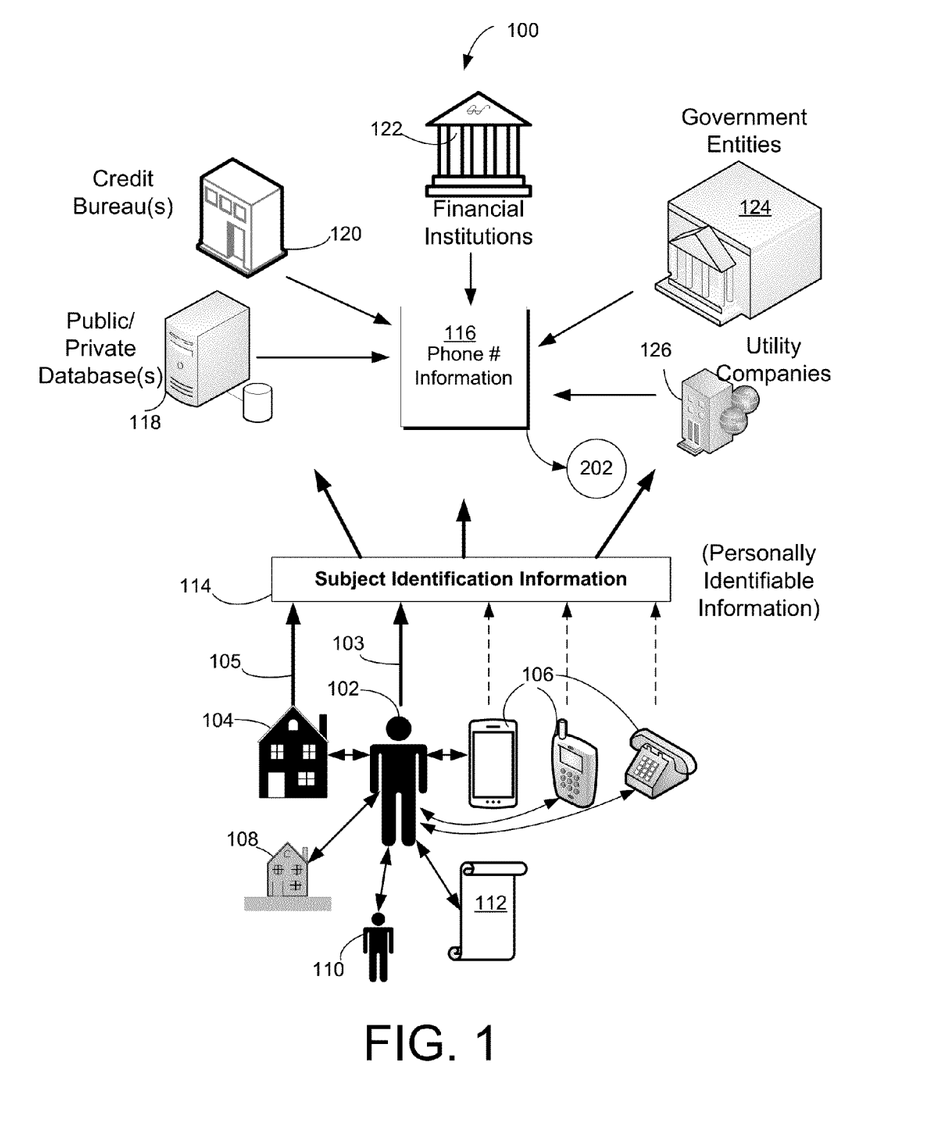
FIG. 1 is a block diagram of an illustrative process 100 for obtaining phone number information, according to an example implementation of the disclosed technology.

Various systems and methods disclosed herein will now be described with reference to the accompanying figures. FIG. 1 depicts an illustrative process 100 for obtaining phone number information. According to an example implementation of the disclosed technology, a name 103 and an address 105 associated with a particular subject 102 may be utilized as input for subject identification (ID) information 114. In certain example embodiments, the address 105 may refer to a physical residence 104 associated with the subject 102. In other example embodiments, the address 105 may be representative of a post office box, a work address, an address of a relative, a rental property, a previous residence 108, etc.

In accordance with an example implementation, additional information may be utilized as input for the subject ID information 114, including but not limited to, names of relatives or associates 110, miscellaneous identification 112 (including driver's license numbers, social security numbers, utility account numbers, maiden names, etc.). In certain example implementations, phone numbers 106 may be utilized as input for the subject ID information 114.

As will be recognized by those of skill in the art, a limited amount of information may be available as input for the subject ID information 114, and certain embodiments of the disclosed technology may attempt to uniquely identify a particular subject 102 and score related phone number(s) based on available input information. In an example implementation, at least a name and one additional piece of information may be utilized as input for the subject ID information 114.

In accordance with an example implementation, the subject ID information 114 may be utilized to search for phone number information 116 (and possibly other information) related to the subject 102. For example, as depicted in FIG. 1, the subject ID information 114 may be utilized to search one or more public and/or private databases 118, credit bureau(s) 120, financial institutions 122, government entities 124, utility companies 126, etc. In certain example implementations, the public and/or private databases 118 may be configured to pre-fetch and store information from the other sources 120 122 124 126, etc. Thus, in one embodiment, it may be sufficient to access only a private database with the subject ID information 114 in order to obtain phone number information 116. In certain example embodiments, the retrieved phone number information 116 may be further analyzed, scored, weighted, etc., by a computing device 202, and will be discussed below with reference to FIG. 2.

Figure 2:
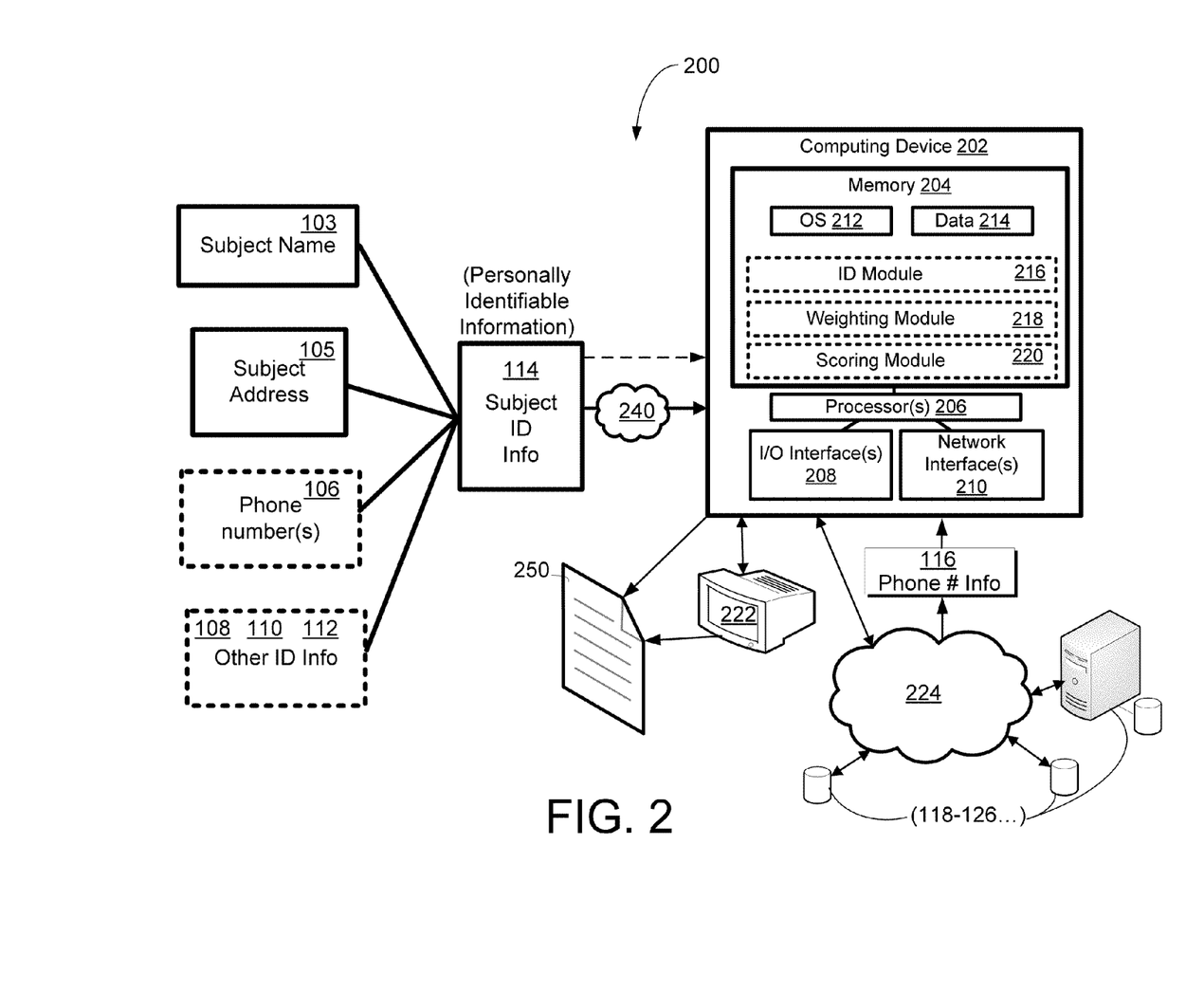
FIG. 2 is an illustrative system 200 for scoring phone numbers, according to an example implementation of the disclosed technology.

FIG. 2 depicts an illustrative system 200 for scoring phone numbers, according to an example implementation of the disclosed technology. Certain example embodiments of the disclosed technology include a computing device 202 for receiving personally identifiable information such as subject identification information 114 (personally identifiable information) as input, for example, via a network connection 240 (such as via an Internet connection, for example). Certain example implementations may further include the capability of directly receiving subject identification information 114 by computing device 202, for example, by a locally connected keyboard, etc.

In accordance with an example implementation of the disclosed technology, the computing device 202 may include a memory 204, one or more processors 206, an input/output interface 208, and one or more network interfaces 210 for communication with the various databases and other information sources 118-126 and for receiving the phone number information 116. In certain embodiments, the computing device 202 includes an operating system 212, data 214, and one or more modules 216 218 220 having computer readable instructions that, when executed by the one or more processors 206, cause the computing device 202 to execute the various processes. For example, the memory 204 may include an identification (ID) module 216, a weighting module 218, and/or a scoring module 220. In accordance with certain example implementation of the disclosed technology, the computing device may be configured to output results 250, for example via a display 220, printer, etc.

As indicated above with reference to FIG. 1, the personally identifiable information or subject identification information 114 (personally identifiable information) that may be used for input to the computing device 202 may include a subject name 103 and a subject address 105. Additional information may include one or more phone numbers 106 and/or other additional identification information 108 110 112 etc.

Figure 3:
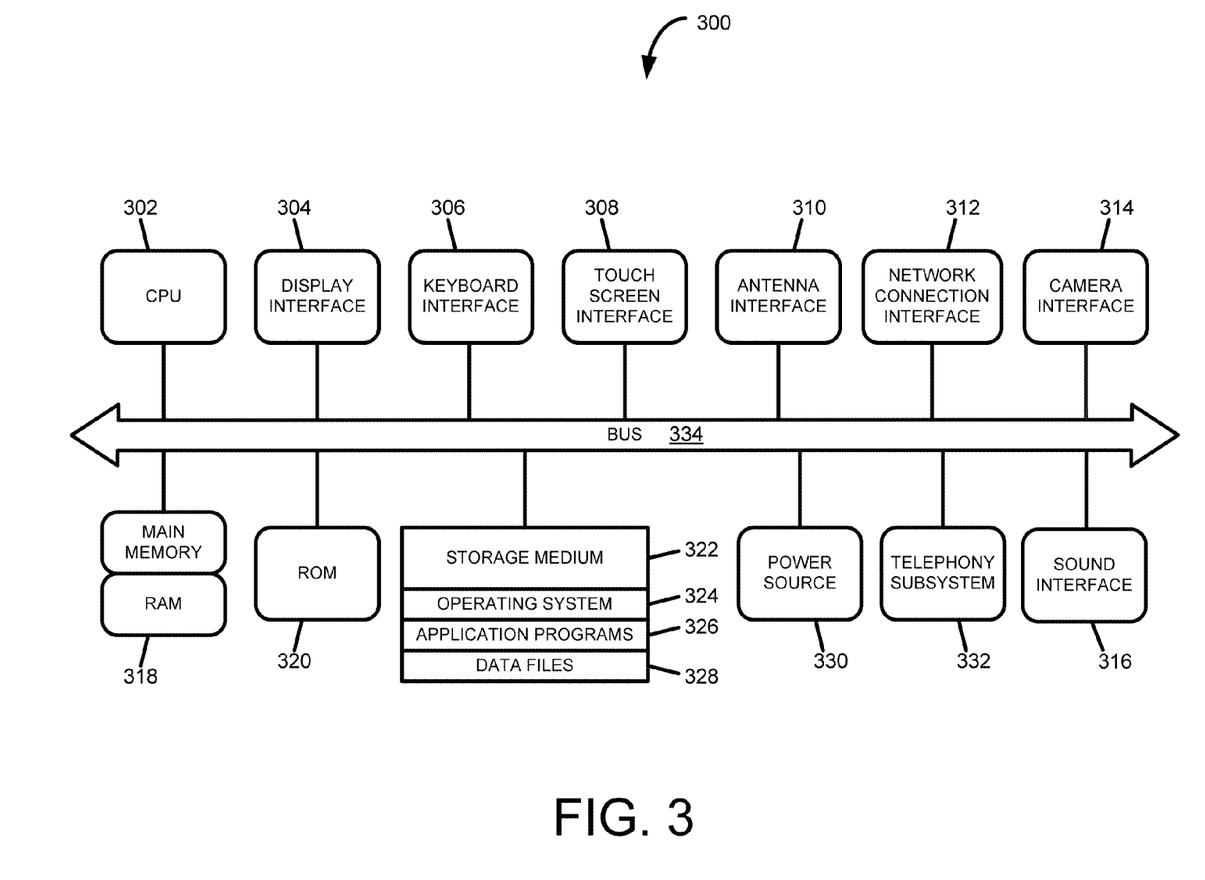
FIG. 3 depicts a computing device 300, according to an example implementation of the disclosed technology.

FIG. 3 is a block diagram of an illustrative computing device 300, according to an example implementation of the disclosed technology. The computing device 300 may be embodied as the computing device 202, as shown in FIG. 2. The computing device 300 of FIG. 3 includes a central processing unit (CPU) 302, where computer instructions are processed; a display interface 304 that acts as a communication interface and provides functions for rendering video, graphics, images, and texts on the display. In certain example implementations of the disclosed technology, the display interface 304 may be directly connected to a local display, such as a touch-screen display associated with a mobile computing device. In another example implementation, the display interface 304 may be configured for providing data, images, and other information for an external/remote display that is not necessarily physically connected to the computing device. For example, a desktop monitor may be utilized for mirroring graphics and other information that is presented on the computing device 300. In certain example implementations, the display interface 304 may wirelessly communicate, for example, via a Wi-Fi channel or other available network connection interface 312 to the external/remote display.

In an example implementation, the network connection interface 312 may be configured as a communication interface, for example, to provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

The computing device 300 may include a keyboard interface 306 that provides a communication interface to a keyboard. In one example implementation, the computing device 300 may include a pointing device or touch screen interface 308. According to certain example implementations of the disclosed technology, the pointing device or touch screen interface 308 may provide a communication interface to various devices such as a pointing device, a touch screen, a depth camera, etc. which may or may not be associated with a display.

The computing device 300 may be configured to use an input device via one or more of input/output interfaces (for example, the keyboard interface 306, the display interface 304, the display interface 308, network connection interface 312, camera interface 314, sound interface 316, etc.,) to allow a user to capture information into the computing device 300. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor such as an accelerometer or gyroscope, a smartcard, and the like. Additionally, the input device may be integrated with the computing device 300 or may be a separate device.

Example implementations of the computing device 300 may include an antenna interface 310 that provides a communication interface to an antenna; a network connection interface 312 that provides a communication interface to a network. In certain implementations, a camera interface 314 is provided for capturing digital images, for example, from a camera. In certain implementations, a sound interface 316 is provided as a communication interface for converting sound into electrical signals using a microphone and for converting electrical signals into sound using a speaker. According to example implementations, a random access memory (RAM) 318 is provided, where computer instructions and data may be stored in a volatile memory device for processing by the CPU 302.

According to an example implementation, the computing device 300 includes a read-only memory (ROM) 320 where invariant low-level system code or data for basic system functions such as basic input and output (I/O), startup, or reception of keystrokes from a keyboard are stored in a non-volatile memory device. According to an example implementation, the computing device 300 includes a storage medium 322 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 324, application programs 326 (including, for example, a web browser application, an invoice extraction module, etc.) and data files 328 are stored. According to an example implementation, the computing device 300 includes a power source 330 that provides an appropriate alternating current (AC) or direct current (DC) to power components. According to an example implementation, the computing device 300 may include and a telephony subsystem 332 that allows the device 300 to transmit and receive sound over a telephone network. The constituent devices and the CPU 302 communicate with each other over a bus 334.

In accordance with an example implementation, the CPU 302 has appropriate structure to be a computer processor. In one arrangement, the computer CPU 302 may include more than one processing unit. The RAM 318 interfaces with the computer bus 334 to provide quick RAM storage to the CPU 302 during the execution of software programs such as the operating system application programs, and device drivers. More specifically, the CPU 302 loads computer-executable process steps from the storage medium 322 or other media into a field of the RAM 318 in order to execute software programs. Data may be stored in the RAM 318, where the data may be accessed by the computer CPU 302 during execution. In one example configuration, the device 300 includes at least 128 MB of RAM, and 256 MB of flash memory.

The storage medium 322 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 300 to access computer-executable process steps, application programs and the like, stored on removable and non-removable memory media, to off-load data from the device 300 or to upload data onto the device 300. A computer program product, such as one utilizing a communication system may be tangibly embodied in storage medium 322, which may comprise a machine-readable storage medium.

Various implementations of the communication systems and methods herein may be embodied in non-transitory computer readable media for execution by a processor. An example implementation may be used in an application of a mobile computing device, such as a smartphone or tablet, but other computing devices may also be used, such as to portable computers, tablet PCs, Internet tablets, PDAs, ultra mobile PCs (UMPCs), etc.

Figure 4:
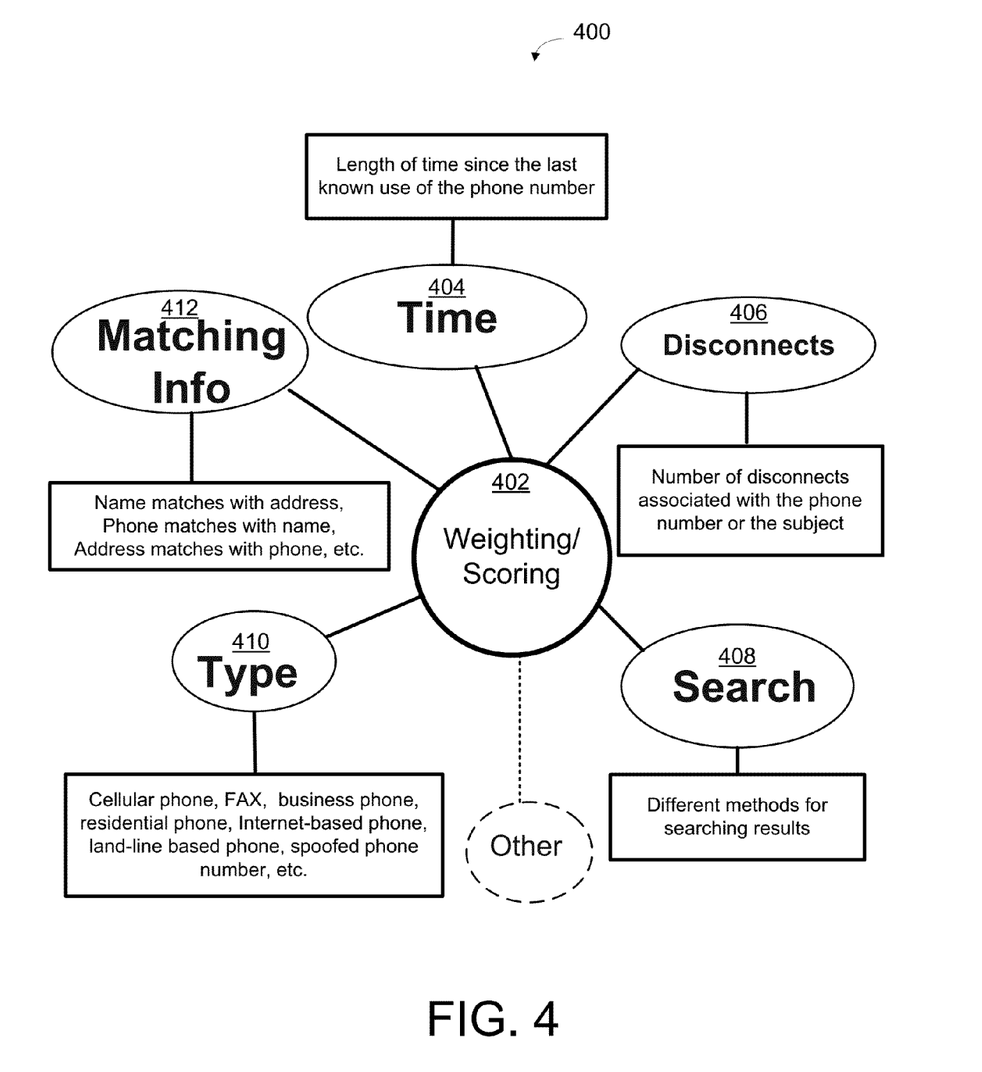
FIG. 4 is a block diagram illustrating example information 400 that may be used or combined in weighting and/or scoring phone number, according to an example implementation of the disclosed technology.

FIG. 4 depicts various information 400 that, if available, may be used alone or combined with the other information in weighting and/or scoring 402 reachability of a phone number, according to an example implementation of the disclosed technology. For example, and as previously discussed, a length of time 404 since the last known use of the phone number may be utilized for the weighting/scoring 402. In some implementations, any number of data sources that indicate usage, activity, and/or records associated with a phone number can be utilized for scoring the phone number.

Another class of information 400 that may be used for input for weighting and/or scoring 402 reachability of a phone number includes disconnects 406. For example, one type of disconnect 406 may be an intentional disconnect by a service provider, for example, to discontinue service of the phone number. Such a disconnect 400 may result from situations including but not limited to: non-payment of a phone bill, cancellation of service, transferring service to a new phone number, etc. Other types of disconnects 406 may be unintentional, and may related to factors such as phone line noise, phone line signal quality, outdated modem software or drivers, an overworked CPU, electrical damage, faulty software, etc.

In an example implementation, the method of searching 408 may influence the weighting/scoring 402. For example, certain implementations of the disclosed technology can encompass many different variables, resulting in variations for searching 408 and obtaining phone number information 116 from the various sources of information 118-126. Some search 408 variations may be based on different information provided in the subject identification information 114 (personally identifiable information). Other search 408 variations may result from the phone type, etc. Certain example implementations of the disclosed technology may perform particular weighting/scoring 402 based on the particular method of search 408. Certain example implementations of the disclosed technology may perform particular weighting/scoring 402 based on the particular data used in the search 408. Certain example implementations of the disclosed technology may perform particular weighting/scoring 402 based on data returned by the search 408.

As indicated previously, the type 410 of phone may influence the weighting/scoring 402. For example, a phone number may be associated with a particular phone type, such as a cellular phone, a business phone, a residential phone, an Internet-based phone, a landline based phone, a spoofed phone number, a facsimile machine, etc. In certain example implementations, the phone type may determine how the returned phone number information 116 is weighted/scored 402. For example, cellular phones and landline phones may be scored using different models to account for differences, not only between such phones, but also in how or where associated information is stored.

According to an example implementation of the disclosed technology, the weighting/scoring 402 may be based, at least in part, on matching information 412. For example, subject information, such as the subject identification information 114 (personally identifiable information) as depicted in FIG. 1, may include one or more of a subject's name, address, phone number etc. In an example implementation, independent information, such as the phone number information 116, as depicted in FIG. 1, may be obtained via a search 408 of one or more of the information sources (for example, the various sources 118-126, as depicted in FIG. 1) and may independently corroborate or match with the information provided in the subject identification information 114.

In one example implementation, if the name and address provided in the subject identification information 114 (personally identifiable information) matches with the independent information returned (for example, in the phone number information 116), then the phone number reachability may be weighted/scored 402 higher than if there was not an independent match. Similarly, if a phone number and name provided in the subject identification information 114 (personally identifiable information) matches with the independent information returned, then the phone number reachability may be weighted/scored 402 higher than if there was not an independent match. In another example implementation, if an address and phone number provided in the subject identification information 114 (personally identifiable information) matches with the independent information returned, then the phone number reachability may be weighted/scored 402 higher than if there was not an independent match. The examples provided above relate to some of the ways the reachability of a phone number may be weighted and/or scored 402, but other factors may further influence the weighting/scoring 402 method and outcome.

Figure 5:
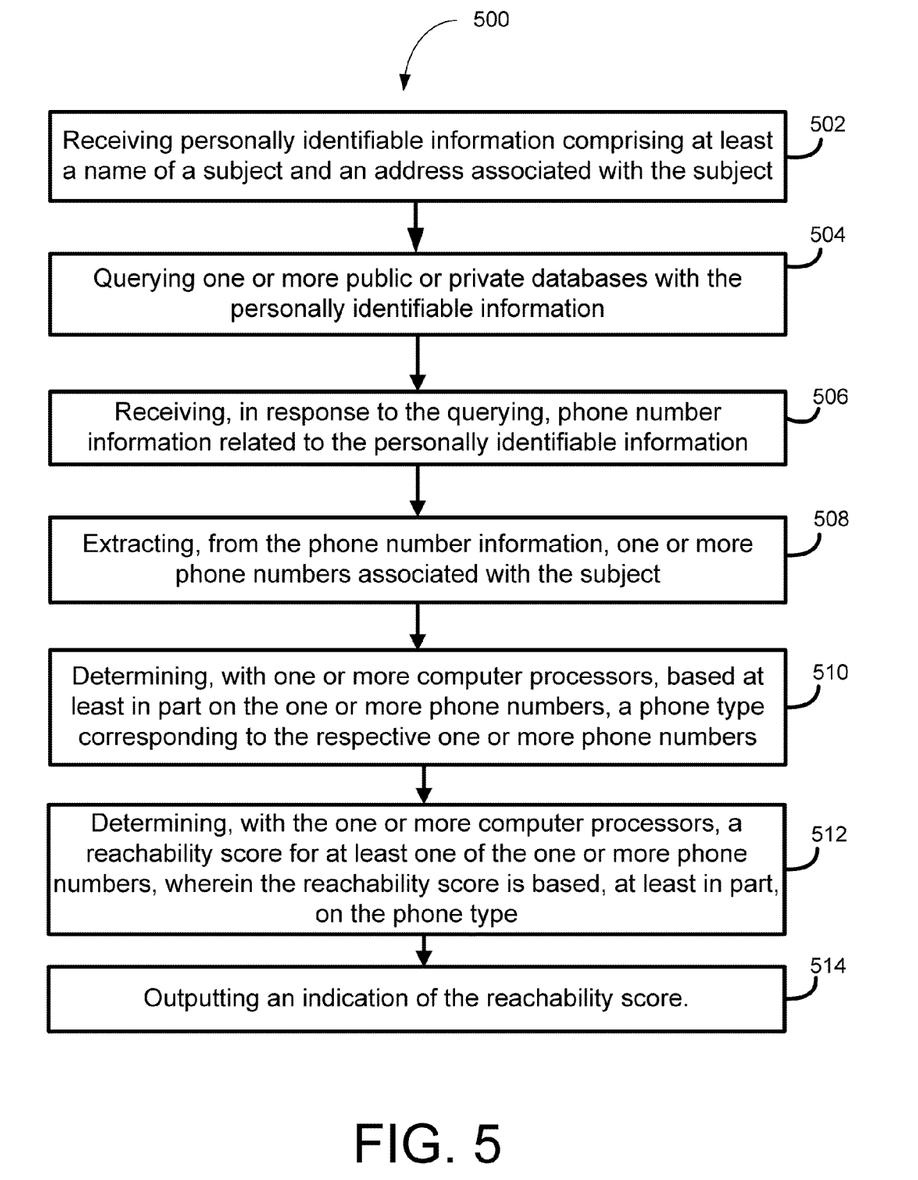
FIG. 5 is a flow diagram of a method 500 according to an example implementation of the disclosed technology.

An example method 500 for scoring a phone number will now be described with reference to the flowchart of FIG. 5. The method 500 starts in block 502, and according to an example implementation includes receiving personally identifiable information comprising at least a name of a subject and an address associated with the subject. In block 504, the method 500 includes querying one or more public or private databases with the personally identifiable information. In block 506, the method 500 includes receiving, in response to the querying, phone number information related to the personally identifiable information. In block 508, the method 500 includes extracting, from the phone number information, one or more phone numbers associated with the subject. In block 510, the method 500 includes determining, with one or more computer processors, based at least in part on the one or more phone numbers, a phone type corresponding to the respective one or more phone numbers. In block 512, the method 500 includes determining, with the one or more computer processors, a reachability score for at least one of the one or more phone numbers, wherein the reachability score is based, at least in part, on the phone type. In block 514, the method 500 includes outputting an indication of the reachability score.

In certain example implementations, the reachability score may further be based on one or more matches between the personally identifiable information and the phone number information. In some example implementations, the reachability score may further be based on a number of previous disconnects associated with the phone number. In certain example implementations, the reachability score may further be based on a length of time since a last known use of the phone number.

In accordance with an example implementation of the disclosed technology, the received phone number information may be based on one or more of: utility, credit, property, public, financial, and governmental records associated with the subject or the personally identifiable information.

According to an example implementation of the disclosed technology, the phone type may include, as applicable, one or more of: a cellular phone, a facsimile machine, a business phone, a residential phone, an Internet-based phone, a landline based phone, and a spoofed phone number.

Example implementation of the disclosed technology may include storing, in a first database, one or more records. Each of the one or more records may include, as applicable, one or more of: an entity identifier uniquely identifying the subject, the one or more phone numbers associated with the subject, phone type characteristics associated with the one or more phone number, and/or the reachable score associated with at least one of the one or more phone numbers.

In accordance with an example implementation of the disclosed technology, the phone number information may be derived from, as applicable, one or more of: driver license information, vehicle registration information, utility information, voting information, criminal information, and court information; deed information, assessment information, tax information, sales information, and/or insurance information.

According to example implementations, certain technical effects can be provided, such as creating certain systems and methods that provide an indication of how successful a call to a certain phone number will be in reaching a particular subject. Example implementations of the disclosed technology can provide the further technical effects of providing systems and methods for updating records with phone numbers that have a high reachability score.

Throughout the specification and claims, numerous specific details are set forth. However, it is to be understood that implementations of the disclosed technology may be practiced without these specific details. In other instances, well-known methods, structures and techniques have not been shown in detail in order not to obscure an understanding of this description. References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Various techniques described herein may utilize interactions with a computing device. The various aspects described herein are presented as methods, devices (or apparatus), systems, and articles of manufacture that may include a number of components, elements, members, modules, nodes, peripherals, or the like. Further, these methods, devices, systems, and articles of manufacture may include or not include additional components, elements, members, modules, nodes, peripherals, or the like.

According to one example implementation, the term computing device, as used herein, may be a CPU, or conceptualized as a CPU (for example, the CPU 302 of FIG. 3). In certain example implementations, the computing device (CPU) may be coupled, connected, and/or in communication with one or more peripheral devices, such as display, navigation system, stereo, entertainment center, Wi-Fi access point, etc. In another example implementation, the term computing device or mobile computing device, as used herein, may refer to a mobile computing device, such as a smartphone, mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In an example embodiment, the mobile computing device may output content to its local display and/or speaker(s). In another example implementation, the mobile computing device may output content to an external display device (e.g., over Wi-Fi) such as a TV or an external computing system.

Furthermore, the various aspects described herein may be implemented using standard programming or engineering techniques to produce software, firmware, hardware, or any combination thereof to control a computing device to implement the disclosed subject matter. The term "article of manufacture" as used herein is intended to encompass a computer program accessible from any computing device, carrier, or media. For example, a computer-readable medium may include a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

In example implementations of the disclosed technology, the computing device 300 may include any number of hardware and/or software applications that are executed to facilitate any of the operations. In example implementations, one or more I/O interfaces may facilitate communication between the computing device 300 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device 300. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device 300 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

As desired, implementations of the disclosed technology may include the computing device 300 with more or less of the components illustrated in FIG. 2 and/or FIG. 3.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A computer-implemented method comprising:
   querying one or more public or private databases with personally identifiable information related to a subject;
   receiving, in response to the querying, phone number information related to the personally identifiable information;
   extracting, from the phone number information, at least one phone number associated with the subject;
   determining, with one or more computer processors, a reachability score for the at least one phone number, wherein the reachability score is based, at least in part, on a number of previous disconnects by a service provider and associated with the at least one phone number; and
   outputting an indication of the reachability score.

2. The method of claim 1, wherein the reachability score is further based on one or more matches between the personally identifiable information and the phone number information.

3. The method of claim 1, wherein a previous disconnect includes one or more of: cancellation of service and transferring service to a new phone number.

4. The method of claim 1, wherein the reachability score is further based on a length of time since a last known use of the at least one phone number.

5. The method of claim 1, wherein the received phone number information is based on one or more of: utility, credit, property, public, financial, and governmental records associated with the subject or the personally identifiable information.

6. The method of claim 1, further comprising determining, with the one or more computer processors, based at least in part on the at least one phone number, a phone type corresponding to the respective at least one phone number.

7. The method of claim 6, wherein the phone type comprises, as applicable, one or more of: a cellular phone, a facsimile machine, a business phone, a residential phone, an Internet-based phone, a land-line based phone, and a spoofed phone number.

8. The method of claim 1, further comprising storing, in a first database, one or more records comprising one or more of: an entity identifier uniquely identifying the subject, the at least one phone number associated with the subject, phone type characteristics associated with the at least one phone number, and the reachable score associated with the at least one phone number.

9. The method of claim 1, further comprising outputting a plurality of phone numbers ranked in order of reachability.

10. A system comprising:
    at least one memory for storing data and computer-executable instructions; and at least one processor configured to access the at least one memory and further configured to execute the computer-executable instructions to:
        query one or more public or private databases with personally identifiable information related to a subject;
        receive, in response to the querying, phone number information related to the personally identifiable information;
        extract, by the at least one processor and from the phone number information, at least one phone number associated with the subject;
        determine, by the at least one processor, a reachability score for the at least one phone number, wherein the reachability score is based, at least in part, on a number of previous disconnects by a service provider and associated with the at least one phone number; and
        output an indication of the reachability score.

11. The system of claim 10, wherein the reachability score is further based on one or more matches between the personally identifiable information and the phone number information.

12. The system of claim 10, wherein a previous disconnect includes one or more of: cancellation of service and transferring service to a new phone number.

13. The system of claim 10, wherein the reachability score is further based on a length of time since a last known use of the at least one phone number.

14. The system of claim 10, wherein the received phone number information is based on one or more of: utility, credit, property, public, financial, and governmental records associated with the subject or the personally identifiable information.

15. The system of claim 10, wherein the at least one processor is further configured to determine, based at least in part on the at least one phone number, a phone type corresponding to the respective at least one phone number.

16. The system of claim 15, wherein the phone type comprises, as applicable, one or more of: a cellular phone, a facsimile machine, a business phone, a residential phone, an Internet-based phone, a land-line based phone, and a spoofed phone number.

17. The system of claim 10, wherein the at least one processor is further configured to execute the computer-executable instructions to store, in a first database, one or more records comprising one or more of: an entity identifier uniquely identifying the subject, the at least one phone numbers associated with the subject, phone type characteristics associated with the at least one phone number, and the reachable score associated with at least one of the at least one phone numbers.

18. The system of claim 10, wherein the at least one processor is further configured to output a plurality of phone numbers ranked in order of reachability.

19. One or more non-transitory computer readable media comprising computer-executable instructions that, when executed by one or more processors, cause the one or more processors to perform a method comprising:
    querying one or more public or private databases with personally identifiable information related to a subject;
    receiving, in response to the querying, phone number information related to the personally identifiable information;
    extracting, from the phone number information, at least one phone number associated with the subject;
    determining, with one or more computer processors, a reachability score for the at least one phone number, wherein the reachability score is based, at least in part, on a number of previous disconnects by a service provider and associated with the at least one phone number; and
    outputting an indication of the reachability score.

20. The computer readable media of claim 19, wherein the computer-executable instructions, when executed by the one or more processors, cause the one or more processors to output a plurality of phone numbers ranked in order of reachability.

* * * * *